(12) United States Patent
Park

(10) Patent No.: US 9,800,313 B2
(45) Date of Patent: *Oct. 24, 2017

(54) METHOD AND APPARATUS OF CONTROLLING PERIODIC CSI REPORTING

(71) Applicant: Jungkil Nam, Seongnam-si, Gyeonggi-do (KR)

(72) Inventor: Dong Hyun Park, Seoul (KR)

(73) Assignee: Jungkil Nam, Seongnam-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/337,585

(22) Filed: Oct. 28, 2016

(65) Prior Publication Data

US 2017/0047980 A1    Feb. 16, 2017

Related U.S. Application Data

(63) Continuation of application No. 14/529,000, filed on Oct. 30, 2014, now Pat. No. 9,510,332.

(30) Foreign Application Priority Data

Nov. 1, 2013    (KR) .................. 10-2013-0132101

(51) Int. Cl.
    *H04W 72/04* (2009.01)
    *H04B 7/06* (2006.01)
    (Continued)

(52) U.S. Cl.
    CPC ......... *H04B 7/0632* (2013.01); *H04B 7/0634* (2013.01); *H04B 7/0639* (2013.01);
    (Continued)

(58) Field of Classification Search
    CPC .... H04W 72/0413; H04L 5/14; H04L 1/1812; H04B 7/0632; H04B 7/0639
    See application file for complete search history.

(56) References Cited

U.S. PATENT DOCUMENTS

2012/0257524 A1    10/2012 Chen et al.
2013/0039327 A1    2/2013 Gao et al.
(Continued)

FOREIGN PATENT DOCUMENTS

WO    WO 2013/141595 A1    9/2013

OTHER PUBLICATIONS

"3$^{rd}$ Generation Partnership Project; Technical Specification Group Radio Access Network; Evolved Universal Terrestrial Radio Access (E-UTRA); Physical layer procedures (Release 11)," 3GPP TS 36.213 V11.1.0, Sep. 2012, pp. 1-160, 3GPP Organizational Partners.

"On Aperiodic CSI Reporting in TDD eIMTA Systems", 3GPP TSG RAN WG1 Meeting #74 Barcelona, Spain, HTC, Aug. 19-23, 2013, pp. 1-3.

"Solutions for TDD-FDD CA", 3GPP TSG RAN WG1 #74bis Guangzhou, China, Qualcomm Incorporated, Oct. 7-11, 2013, pp. 1-7.

(Continued)

*Primary Examiner* — Wei Zhao
(74) *Attorney, Agent, or Firm* — Paratus Law Group, PLLC

(57) ABSTRACT

Exemplary embodiments of the present invention relates to an apparatus and method for performing periodic CSI reporting available in a system supporting a TDD-FDD aggregation operation and an FDD-TDD aggregation operation. A periodicity and an offset for periodic reporting of channel quality indicator and precoding matrix indicator may be determined based on the cell type of a primary serving cell for a TDD-FDD carrier aggregation and an FDD-TDD carrier aggregation.

18 Claims, 8 Drawing Sheets

(51) Int. Cl.
*H04J 4/00* (2006.01)
*H04L 1/18* (2006.01)
*H04L 5/14* (2006.01)

(52) U.S. Cl.
CPC .............. *H04B 7/0647* (2013.01); *H04J 4/00* (2013.01); *H04L 1/1812* (2013.01); *H04L 5/14* (2013.01); *H04W 72/0413* (2013.01)

(56) References Cited

U.S. PATENT DOCUMENTS

| | | | |
|---|---|---|---|
| 2013/0114554 A1 | 5/2013 | Yang et al. | |
| 2014/0185530 A1* | 7/2014 | Kuchibhotla | H04W 76/023 370/329 |
| 2014/0204892 A1* | 7/2014 | Oizumi | H04L 1/00 370/329 |
| 2015/0078222 A1* | 3/2015 | Yang | H04B 7/2656 370/280 |
| 2015/0195070 A1* | 7/2015 | Kim | H04L 1/0027 370/329 |

OTHER PUBLICATIONS

3rd Generation Partnership Project; Technical Specification Group Radio Access Network; Evolved Universal Terrestrial Radio Access (E-UTRA); Physical layer procedures (Release 11); 3GPP TS 36.213 V11.4.0, Sep. 2013, pp. 1-183, 3GPP Organizational Partners.
International Search Report for International Patent Application No. PCT/KR2014/010264, Jan. 23, 2015, pp. 1-3.
Written Opinion for International Patent Application No. PCT/KR2014/010264, Jan. 23, 2015, pp. 1-9.

* cited by examiner (a) CA of TDD & FDD (b) CA of TDD & FDD DL (c) CA of TDD DL & FDD

METHOD AND APPARATUS OF CONTROLLING PERIODIC CSI REPORTING

CROSS-REFERENCE TO RELATED APPLICATIONS

This application is continuation of U.S. application Ser. No. 14/529,000, filed on Oct. 30, 2014, which claims priority from and the benefit of Korean Patent Application No. 10-2013-0132101, filed on Nov. 1, 2013, each of which is hereby incorporated by reference in its entirety.

BACKGROUND

1. Field

The present disclosure relates to a wireless communication, more specifically a method and apparatus of periodic channel state information reporting applicable to a system supporting TDD (Time Division Duplex)-FDD (Frequency Division Duplex) joint operation.

2. Discussion of the Background

A wireless communication system may support Frequency Division Duplex (FDD) scheme and Time Division Duplex (TDD) scheme. In the FDD scheme, an uplink transmission and a downlink transmission may be simultaneously performed in a cell because a carrier frequency for an uplink (UL) transmission is different from a carrier frequency for a downlink (DL) transmission exists. In the TDD scheme, with respect to one cell, an uplink transmission and a downlink transmission are distinguished from each other based on different time slots. In the TDD scheme, a base station and a user equipment perform switching operations between a transmission mode and a reception mode because the same carrier is used for both an uplink transmission and a downlink transmission. In the TDD scheme, a Special Subframe may be added to provide a guard time for switching between the transmission mode and the reception mode. The Special Subframe may include Downlink Pilot Time Slot (DwPTS), Guard Period (GP), and Uplink Pilot Time Slot (UpPTS). According to the TDD scheme, resource amounts for the uplink transmission and resource amounts for the downlink transmission may be asymmetrically assigned through various uplink (UL)-downlink (DL) configurations.

Currently, remaining frequency resources are scarce and various technologies have been utilized in wide frequency bands because of the frequency resource scarcity. For this reason, in order to provide a wideband bandwidth for supporting higher data-rate requirements, each of scattered bands has been configured to satisfy basic requirements to operate an independent system and a carrier aggregation (CA) scheme, which aggregates various frequency bands into one system, has been adopted. Here, each frequency band or carrier capable of an independent operation may be defined as a component carrier (CC).

Further, a wireless communication system uses a link adaptation in order to make the maximum use of a given channel capacity, to control Modulation and Coding Scheme (MCS) and Transmission Power according to a given channel. Here the link adaptation means changing modulation and channel coding scheme depending on a wireless link condition to optimize the communication performance. To perform this link adaptation at a base station, the periodic feedback of channel status information by a terminal is required, and the terminal carries out the periodic channel status reporting for it.

Recently, considered is a TDD-FDD joint operation technique supporting the CA of an FDD band (or carrier) and a TDD band (or carrier) and/or a dual connectivity thereof. A terminal supporting TDD-FDD joint operation may be configured with a TDD serving cell and an FDD serving cell simultaneously. However, the existing periodic channel status reporting method assumes only the periodic channel status reporting in case that a terminal is configured with a single serving cell, or the terminal is configured with an FDD or a TDD type serving cell; it does not consider the case that a TDD serving cell and an FDD serving cell are configured at the terminal. Therefore, there exists a need for a method of a periodic channel status reporting for a terminal configured with TDD-FDD joint operation.

SUMMARY

An exemplary embodiment of the present invention provides a method and apparatus for a periodic CSI transmission in a wireless communication system.

An exemplary embodiment of the present invention provides a method and apparatus for a periodic CSI reporting for a terminal configured with TDD-FDD joint operation.

An exemplary embodiment of the present invention provides a method of configuring a periodicity value for a periodic CSI reporting on a serving cell when TDD-FDD joint operation is configured at a terminal.

A terminal supporting a periodic Channel Quality Indicator (CQI)/Precoding Matrix Index (PMI) reporting is provided in a wireless system capable of the carrier aggregation (CA) of an FDD-based first serving cell and a TDD-based second serving cell. The terminal includes a receiver to receive TDD-FDD CA configuration information for the CA of the first serving cell and the second serving cell, and to receive a parameter about the periodic CQI/PMI reporting point of time of the first serving cell or the second serving cell, a RRC processing part to configure the CA of the first serving cell and the second serving cell at the terminal based on the TDD-FDD CA configuration information, and to detect a period and offset for a periodic CQI/PMI reporting of the first serving cell or the second serving cell based on the parameter about the periodic CQI/PMI reporting point of time, and a transmitting unit to transmit the CQI/PMI reporting to a base station based on the detected period and an offset.

According to an aspect of the present invention, in a wireless communication system supporting the CA of an FDD-based first serving cell and a TDD-based second serving cell, provided is a base station which supports a periodic CQI/PMI reporting. The base station includes a transmitting unit to transmit TDD-FDD CA configuration information for the CA of the first serving cell and the second serving cell to a terminal, and to transmit a parameter about the periodic CQI/PMI reporting point of time of the first serving cell and the second serving cell, a RRC processing part to detect a period and an offset for the periodic CQI/PMI reporting of the first serving cell and the second serving cell based on the parameter about the periodic CQI/PMI reporting point of time, and a receiver to receive the periodic CQI/PMI reporting based on the detected period and offset.

According to an aspect of the present invention, in a wireless communication system supporting the CA of an FDD-based first serving cell and a TDD-based second serving cell, a method of periodic CQI/PMI reporting is provided. The method comprises receiving TDD-FDD CA configuration information for the CA of the first serving cell and the second serving cell, CA configuring the first serving cell and the second serving cell at the terminal based on the TDD-FDD CA configuration information, receiving the parameter about the periodic CQI/PMI reporting point of time of the first serving cell and the second serving cell, detecting the period and the offset for the periodic CQI/PMI reporting of the first serving cell and the second serving cell based on the parameter about the periodic CQI/PMI reporting point of time, and transmitting the periodic CQI/PMI reporting to a base station based on the detected period and the offset.

According to aspects, when a terminal is configured with TDD-FDD carrier aggregation (or dual connectivity), a smooth data transmission/reception between a terminal and a base station may be provided through the configuration of the periodicity value for an effective periodic CSI reporting to a secondary serving cell.

DETAILED DESCRIPTION OF THE ILLUSTRATED EMBODIMENTS

Figure 1:
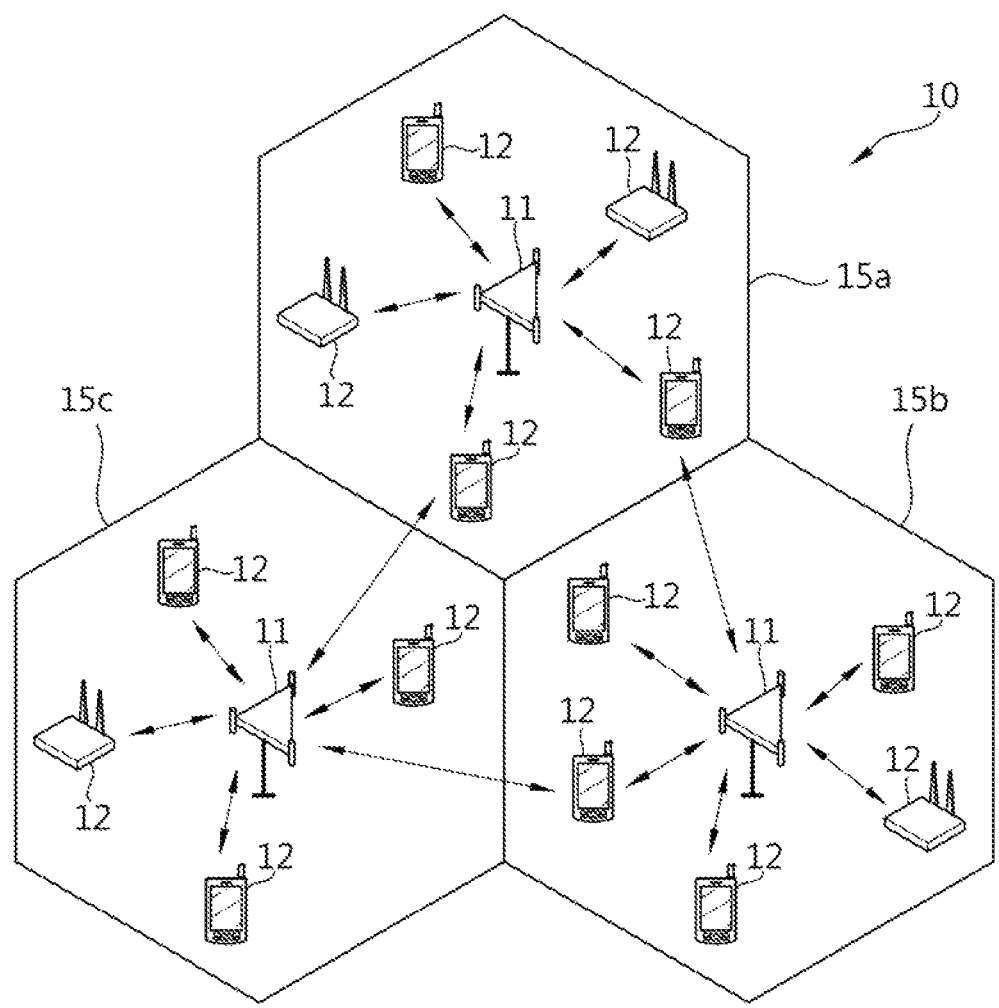
FIG. 1 illustrates a wireless communication system according to an exemplary embodiment of the present invention.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

FIG. 1 is a diagram illustrating a wireless communication system according to an exemplary embodiment of the present invention.

According to FIG. 1, a wireless communication system 10 is widely deployed in order to provide diverse telecommunication services, such as voice and packet data. A wireless communication system includes at least one base station 11 (BS). Each BS 11 provides telecommunication service to certain cells 15a, 15b, and 15c. A cell may again be divided into multiple sectors.

User equipment 12 (mobile station, MS) may be located at a certain location or mobile, and may also be referred to as different terms, including UE (user equipment), MT (mobile terminal), UT (user terminal), SS (subscriber station), wireless device, PDA (personal digital assistant), wireless modem, terminal, and handheld device. A base station 11 may also be referred to as eNB (evolved-NodeB), BTS (Base Transceiver System), Access Point, femto base station, Home nodeB, and relay. A cell inclusively refers to various coverage areas, such as mega cell, macro cell, micro cell, pico cell, and femto cell.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

Carrier Aggregation (CA), which is also referred to as spectrum aggregation or bandwidth aggregation, supports multiple carriers. Each individual unit carrier, which is aggregated by carrier aggregation, is referred to as Component Carrier (CC). Each component carrier is defined by bandwidth and center frequency. CA is introduced to support increasing throughput, to prevent cost increase due to the introduction of the wideband radio frequency and to ensure the compatibility with the existing system. For example, if five component carriers are allocated as granularity that has a carrier unit with 20 MHz bandwidth, it can support 100 MHz bandwidth at maximum.

CA can be divided as contiguous carrier aggregation, which is made among continuous CCs, and non-contiguous carrier aggregation, which is made among non-continuous CCs. The number of carriers aggregated between uplink and downlink can be configured differently. It is referred to as symmetric aggregation when there are equal number of downlink CCs and uplink CCs, and it is referred to as asymmetric aggregation when the number of downlink CCs and the number of uplink CCs are not equal.

The size of component carriers (in other words, bandwidth) can be different. For example, if five component carriers are used to form 70 MHz band, 5 MHz component carrier (carrier #0)+20 MHz component carrier (carrier #1)+20 MHz component carrier (carrier #2)+20 MHz component carrier (carrier #3)+5 MHz component carrier (carrier #4) can be aggregated together.

Hereinafter, a multiple carrier system includes the system that supports carrier aggregation. Contiguous CA and/or non-contiguous CA can be used in the multiple carrier system; in addition, both symmetric aggregation and asymmetric aggregation can be used in the multiple carrier system as well. A serving cell can be defined as a component frequency band based on multiple CC system which can be aggregated by CA. A serving cell may include a primary serving cell (PCell) and a secondary serving cell (SCell). A PCell means a serving cell which provides security input and Non-Access Stratum (NAS) mobility information on Radio Resource Control (RRC) establishment or re-establishment state. Depends on the capability of a user equipment, at least one cell can be used together with a PCell to form an aggregation of serving cells, the cell used with a PCell is referred to as an SCell. An aggregation of serving cells which configured for a user equipment may include one PCell, or one PCell together with at least one SCell.

Downlink component carrier corresponding to a PCell refers to Downlink (DL) Primary Component Carrier (PCC), and uplink component carrier corresponding to a PCell refers to Uplink (UL) PCC. In addition, downlink component carrier corresponding to a SCell refers to a DL Secondary Component Carrier (SCC), and an uplink component carrier corresponding to a SCell refers to a UL SCC. Only DL CC may correspond to a serving cell, or a DL CC and an UL CC together may correspond to a serving cell.

Figure 2:
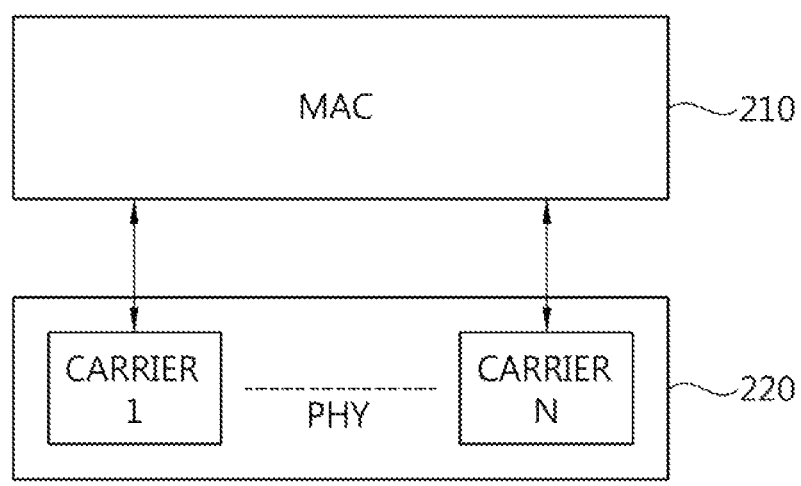
FIG. 2 illustrates an example of a protocol structure to support a multiple carrier system according to an exemplary embodiment of the present invention.

FIG. 2 is a diagram illustrating an example of a protocol structure for supporting a multi-carrier system according to an exemplary embodiment of the present invention.

Referring to FIG. 2, common Medium Access Control (MAC) entity 210 manages physical layer 220 which uses a plurality of carriers. The MAC management message, transmitting through a certain carrier, may be applied to other carriers. That is, the MAC management message is a message which controls other carriers including the certain carrier mentioned above. A physical layer 220 may be operated by the Time Division Duplex (TDD) and/or the Frequency Division Duplex (FDD).

Figure 3:
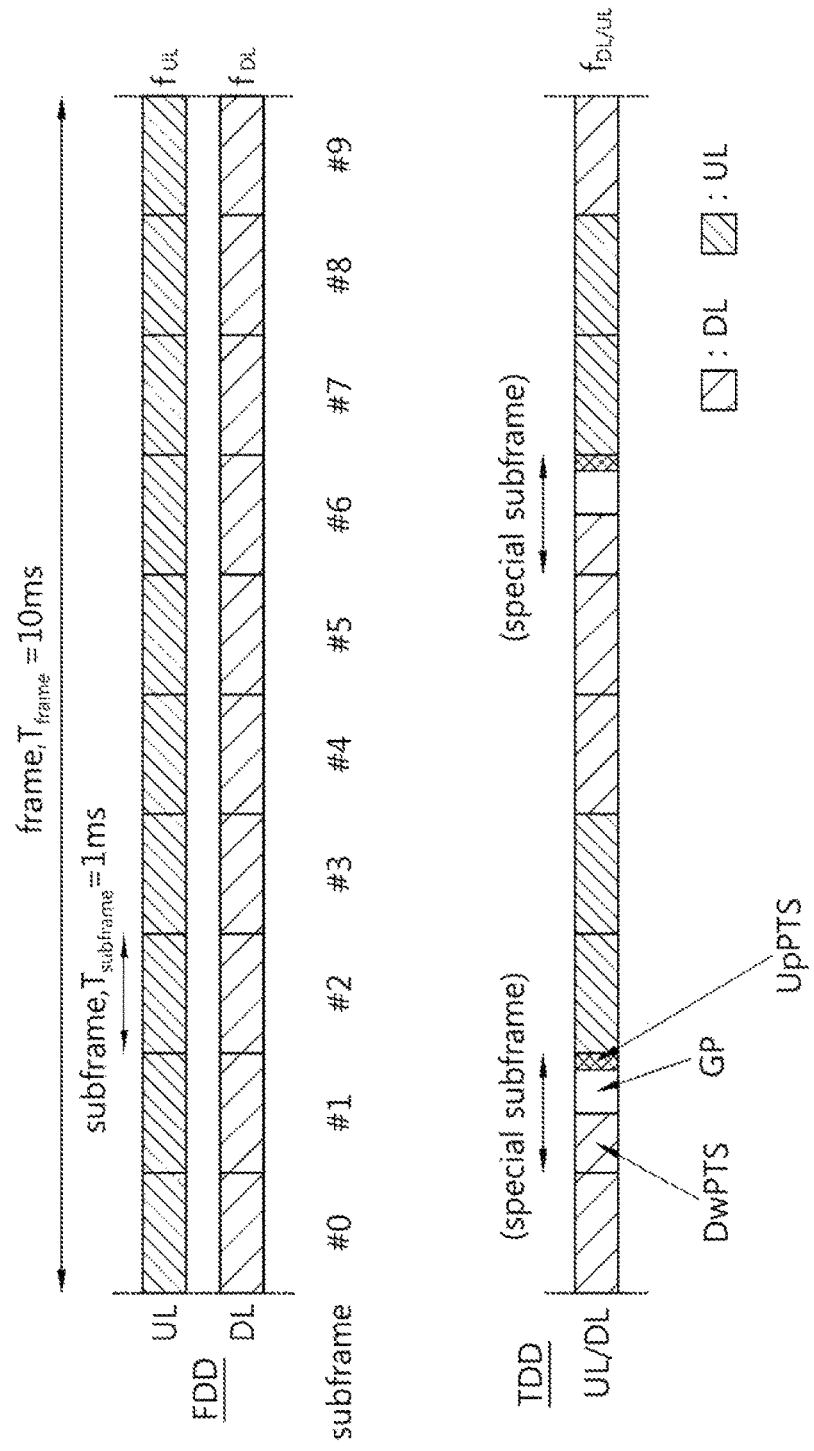
FIG. 3 is an example of a radio frame structure according to an exemplary embodiment of the present invention. This is an FDD radio frame structure and a TDD radio frame structure.

FIG. 3 is a diagram illustrating an example of a radio frame structure according to an exemplary embodiment of the present invention. The diagram illustrates a FDD radio frame structure and a TDD radio frame structure.

Referring to FIG. 3, one radio frame includes 10 subframes, and one subframe includes 2 consecutive slots.

In the FDD, both carrier used for UL transmission and carrier used for DL transmission exist, and UL transmission and DL transmission can be performed simultaneously in one cell.

In the TDD, on one cell basis, UL transmission and DL transmission can always distinguished in time. Because a same carrier is used for both UL transmission and DL transmission, a base station and user equipment repeatedly switches between the transmission mode and the reception mode. In the TDD, special subframe can be placed to provide a guard time which is for switching mode between the transmission and the reception. Special subframe, as shown, includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is needed to avoid interference between an uplink and a downlink, and during the GP, no UL transmission and DL transmission occurs.

Table 1 shows an example of TDD UL-DL configuration of radio frame. UL/DL configuration defines reserved subframe for UL transmission or reserved subframe for DL transmission. That is, UL-DL configuration informs the rules how the uplink and the downlink are allocated (or reserved) in every subframe of one radio frame.

TABLE 1

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' denotes a DL subframe, 'U' denotes a UL subframe, and 'S' denotes a special subframe. As shown to Table 2, subframe 0 and 5 are always allocated to DL transmission, and subframe 2 is always allocated to UL-transmission. As shown to Table 2, each UL-DL configuration has a different number and position of DL subframe and UL subframe in one radio frame. Through diverse UL-DL configuration, the amount of resource allocated to UL/DL transmission can be given asymmetrically. To avoid severe interference between UL and DL among cells, neighboring cells generally have same UL-DL configuration.

The point changing from DL to UL or the point changing from UL to DL is referred to the switching point. The switch-point periodicity, which is either 5 ms or 10 ms, means a repeating period of the same chaining aspect between the UL subframe and DL subframe. For example, referring to the UL/DL configuration 0, subframe from 0 to 4 changes D->S->U->U->U, subframe from 5 to 9 changes, as same as before, D->S->U->U->U. Since one subframe is 1 ms, the switch-point periodicity is 5 ms. That is, the switch-point periodicity is shorter than the length of one radio frame (10 ms), the changing aspect in the radio frame is repeated for one time.

The UL-DL configuration in above Table 1 can be transmitted from a base station to a user equipment through system information. The base station can inform a UL-DL allocation status change in a radio frame to a UE by transmitting the index of the UL-DL configuration whenever the UL-DL configuration changes. Or the UL-DL configuration can be control information which is transmitted to every UE in the cell through broadcast channel.

Further, there are some physical channels utilized in a physical layer.

First, as a downlink physical channel, Physical Downlink Control Channel (PDCCH) informs a terminal of the resource allocation of Paging Channel (PCH) and Downlink Shared Channel (DL-SCH), and Hybrid Automatic Repeat Request (HARQ) information. PDCCH can bear a uplink grant informing the terminal of the resource allocation of uplink transmission. Physical Downlink Shard Channel (PDSCH) is mapped DL-SCH. Physical Control Format Indicator Channel (PCFICH) informs the terminal of the number of OFDM symbols used in PDCCHs, and transmitted every subframe. Physical Hybrid ARQ Indicator Channel (PHICH) is a downlink channel, which carries a HARQ ACK/NACK signal that is a response of the uplink transmission.

Next, as a uplink physical channel, Physical Uplink Control Channel (PUCCH) carries uplink control information such as Hybrid Automatic Repeat request (HARQ) Acknowledgment (ACK)/Non-acknowledgment (NACK), channel status information (CSI) representing downlink channel status, including, Channel Quality Indicator (CQI), precoding matrix index (PMI), precoding type indicator (PTI), rank indication (RI), etc. Physical Uplink Shared Channel (PUSCH) carries Unlink Shared Channel (UL-SCH). Physical Random Access Channel (PRACH) carries a random access preamble.

CQI provides information about link adaptive parameter that a terminal can support in a given time. CQI may indicate the data rate which may be supported by a downlink channel in light of the characteristic of a terminal receiver, SINR (signal to interference plus noise ratio) and so on. A base station may determine the modulation scheme (QPSK, 16-QAM, 64-QAM, etc.) to be applied to downlink channel and coding rate using the CQI. CQI can be generated in various methods. For example, CQI may be generated by the way of quantizing a channel condition itself to feedback it, the way of calculating a SINR (signal to interference plus noise ratio) to feedback it, the way of notifying the status, which is actually applied, such as MCS (Modulation Coding Scheme), and so on. In case that CQI is generated based on MCS, MCS includes modulation scheme and coding scheme, and corresponding coding rate, etc.

PMI provides information about pre-coding matrix in a codebook based pre-coding. PMI is related to MIMO (Multiple Input Multiple Output). In MIMO, the feedback of PMI is referred to as closed loop MIMO.

RI is information about rank (that is, the number of layers) recommended by a terminal. That is, RI indicates the number of independent streams which are used for spatial multiplexing. RI is fed back only in case that the terminal operates in MIMO mode which utilizes spatial multiplexing. RI is always associated with one or more CQI feedback. That is, CQI which is fed back is computed with the assumption of a specific RI value. RI is fed back fewer times because the rank of a channel changes more slowly than CQI in general. The period of RI transmission may be a multiple of a CQI/PMI transmission period. RI is given for entire system bandwidth while frequency selective RI feedback is not supported.

CSI may be transmitted periodically in PUCCH in accordance with the period determined at an upper layer. The terminal may be configured half statically by an upper layer signal to feedback different CSI components (CQI, PMI, RI) periodically in PUCCH. At this pint, the terminal transmits the corresponding CSI according to the defined CSI modes defined as the following table.

TABLE 2

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Further, a periodic CSI reporting mode in PUCCH is supported for each of transmission mode as follows.

TABLE 3

| transmission mode | PUCCH CSI reporting modes |
|---|---|
| transmission mode 1 | Modes 1-0, 2-0 |
| transmission mode 2 | Modes 1-0, 2-0 |
| transmission mode 3 | Modes 1-0, 2-0 |
| transmission mode 4 | Modes 1-1, 2-1 |
| transmission mode 5 | Modes 1-1, 2-1 |
| transmission mode 6 | Modes 1-1, 2-1 |
| transmission mode 7 | Modes 1-0, 2-0 |
| transmission mode 8 | Modes 1-1, 2-1 terminal is configured with PMI/RI reporting; modes 1-0, 2-0 terminal is not configured with PMI/RI reporingt |
| transmission mode 9 | Modes 1-1, 2-1 terminal is configured with PMI/RI reporting and the number of CSI-RS port is greater than 1; modes 1-0, 2-0 terminal is not configured with PMI/RI reporting or the number of CSI-RS port is 1 |
| transmission mode 10 | Modes 1-1, 2-1 terminal is configured with PMI/RI reporting and the number of CSI-RS port is greater than 1; modes 1-0, 2-0 terminal is not configured with PMI/RI reporting or the number of CSI-RS port is 1 |

For the terminal configured in transmission modes 1-9, one periodic CSI reporting mode is configured in each of serving cell by upper layer signaling. For the terminal configured in transmission 10, one or more periodic CSI reporting modes are configured in each serving cell by upper layer signaling.

CSI report via PUCCH may be in various report types as follows according to CQI/PMI/RI transmission combination, and supported are period and offset values distinguished depending on each report type (hereinafter, referred as CSI type or type in short).

Type 1: supports CQI feedback on subband selected by a terminal.

Type 1a: supports subband CQI and a second PMI feedback.

Type 2, 2b, 2c: supports wideband CQI and PMI feedback.

Type 2a: supports wideband PMI feedback.

Type 3: supports RI feedback.

Type 4: transmits wideband CQI.

Type 5: supports RI and wideband PMI feedback.

Type 6: supports RI and PTI feedback.

Period, $N_{pd}$, and Offset $N_{OFFSET,CQI}$ for CQI/PMI reporting are determined based on parameter cqi-pmi-Configindex ($I_{CQI/PMI}$). This is defined as following Table 4 in case of FDD and is defined as following Table 5 in case of TDD.

TABLE 4

| $I_{CQI/PMI}$ | Value of $N_{pd}$ | Value of $N_{OFFSET, CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} = 317$ | | Reserved |
| $318 \leq I_{CQI/PMI} \leq 349$ | 32 | $I_{CQI/PMI} - 318$ |
| $350 \leq I_{CQI/PMI} \leq 413$ | 64 | $I_{CQI/PMI} - 350$ |
| $414 \leq I_{CQI/PMI} \leq 541$ | 128 | $I_{CQI/PMI} - 414$ |
| $542 \leq I_{CQI/PMI} \leq 1023$ | | Reserved |

TABLE 5

| $I_{CQI/PMI}$ | Value of $N_{pd}$ | Value of $N_{OFFSET, CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |
| $156 \leq I_{CQI/PMI} \leq 315$ | 160 | $I_{CQI/PMI} - 156$ |
| $316 \leq I_{CQI/PMI} \leq 1023$ | | Reserved | cqi-pmi-ConfigIndex($I_{CQI/PMI}$) is set by upper layer signal such as RRC signaling.

In the periodic CQI/PMI reporting for TDD, reporting period($N_{pd}$) value applied to serving cell c depends on TDD UL/DL configuration in primary serving cell(Pcell).

In one example, all UL subframes within one radio frame are used for CQI/PMI reporting, and the reporting period of $N_{pd}=1$ is applicable for serving cell c only if the TDD UL/DL configuration of the primary serving cell belongs to $\{0, 1, 3, 4, 6\}$.

In another example, the reporting period of $N_{pd}=5$ is applicable for serving cell c only if the TDD UL/DL configuration of the primary serving cell belongs to $\{0, 1, 2, 6\}$.

In other example, the reporting period of $N_{pd}=\{10, 20, 40, 80, 160\}$ is applicable for serving cell c with regard to any TDD UL/DL configuration in primary serving cell.

Further, enhanced Interference Management and Traffic Adaptation (eIMTA) technique exists for inter-base station interference control and adaptive traffic control. eIMTA technique provides dynamic change of TDD UL/DL configuration in a time domain depending on traffic or interference environment. For example, a terminal configured with eIMTA may TDD UL/DL configuration dynamically per subframe based on the reception of eIMTA-RNTI masked PDCCH.

Figure 4:
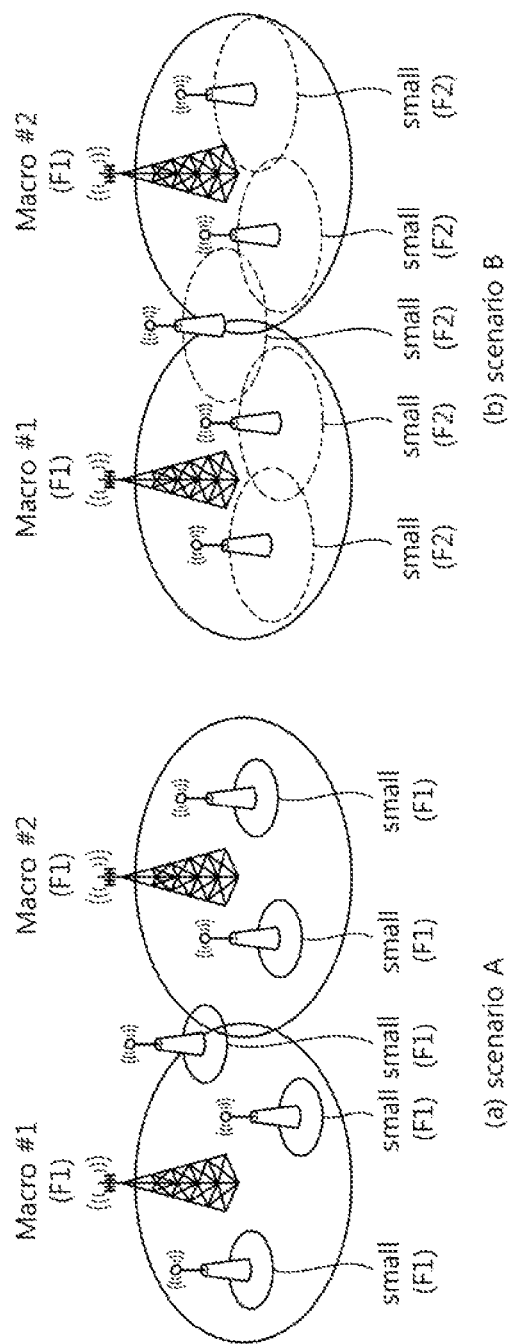
FIG. 4 illustrates an example of a deployment scenario to which eIMTA is applied.

FIG. 4 illustrates an example of deployment scenario to which eIMTA is applied.

Referring to FIG. 4, a plurality of macro cells and small cells (e.g., pico cells or femto cells) may be deployed contiguously with the same frequency or the adjacent frequency. (a) is a deployment scenario in which multiple outdoor small cells utilize the same frequency band as that of macro cells. (b) is a deployment scenario in which a plurality of small cells use the same frequency band, macro cells uses frequency bands which is adjacent to the frequency bands used by small cells, all macro cells have the same UL/DL configuration, and small cells can adjust UL/DL configuration.

In the above scenarios, small cells (e.g., pico cells or femto cells) except macro cell may be supported by the dynamic change of TDD UL/DL configuration for interference or traffic control.

When the dynamic change of TDD UL/DL configuration is supported as stated above, DL HARQ reference configuration (that is, DL reference UL/DL configuration) for DL HARQ may be selected among TDD UL/DL configuration $\{2, 4, 5\}$.

In this case, a terminal may not expect in DL HARQ reference configuration that any subframe which is configured as UL subframe or special subframe is used dynamically as DL subframe.

Recently, considered is a joint operation technique which supports (1) the CA (Carrier Aggregation) of FDD band or carrier with TDD band or carrier and/or (2) dual connectivity.

Figure 5:
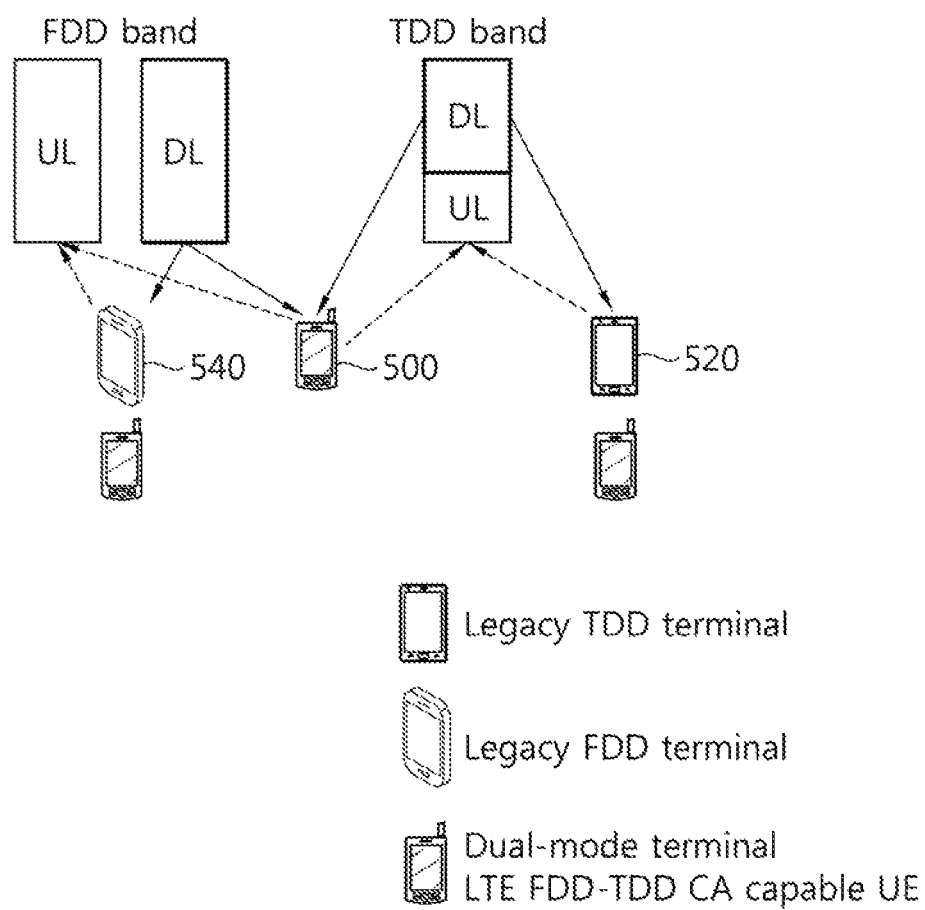
FIG. 5 illustrates an exemplary embodiment of FDD-TDD joint operation technique that may be applicable to an exemplary embodiment of the present invention.

FIG. 5 illustrates an example of FDD-TDD CA that may be applicable to an exemplary embodiment of the present invention.

Referring to FIG. 5, a legacy TDD terminal (520) may receive wireless communication service only in TDD band, and legacy FDD terminal (540) may receive wireless communication service only in FDD band. On the other hand, FDD-TDD CA capable terminal (UE, 500) may receive wireless communication service in FDD band and TDD band, and may receive CA based wireless communication service simultaneously in TDD band carrier and FDD band carrier.

For the above TDD-FDD CA, the following exemplary deployment scenarios may be considered.

In one example: an FDD base station and a TDD base station is co-located in the same area (for example, CA scenario 1 to 3), and the FDD base station and the TDD station are not co-located in the same place but connected via an ideal backhaul (CA scenario 4).

In another example: an FDD base station and a TDD station are not co-located in the same area, and are connected via non-ideal backhaul (for example, small cell scenario 2a, 2b and macro-macro scenario).

Nevertheless, it is preferable that the TDD base station and FDD base station are connected via the ideal backhaul for TDD-FDD CA, and a TDD cell and an FDD cell are synchronized to operate.

Further, the following prerequisites may be taken into consideration for TDD-FDD CA.

First, FDD-TDD CA capable terminals may access an FDD single mode carrier and a legacy TDD single mode carrier.

Second, legacy FDD terminals and TDD-FDD CA capable terminals may camp on and connect with an FDD carrier that is a part of the joint-operating FDD/TDD network.

Third, legacy TDD terminals and TDD-FDD CA capable terminals may camp on and connect with a TDD carrier which is a part of the joint-operating FDD/TDD network.

Fourth, network architecture enhancement for facilitating FDD-TDD CA (e.g., for non-ideal backhaul, etc.) may be considered. However, it should be considered to keep network architecture change at a minimum because it is still important from the operator's point of view.

Also, the following terminal capabilities may be considered when a terminal supports TDD-FDD CA.

Figure 6:
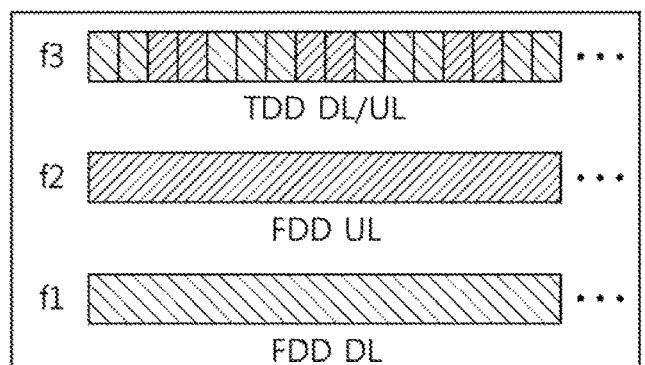
FIG. 6 illustrates examples of terminal capabilities for TDD-FDD joint operation that may be applicable to an exemplary embodiment of the present invention.
Figure 6:
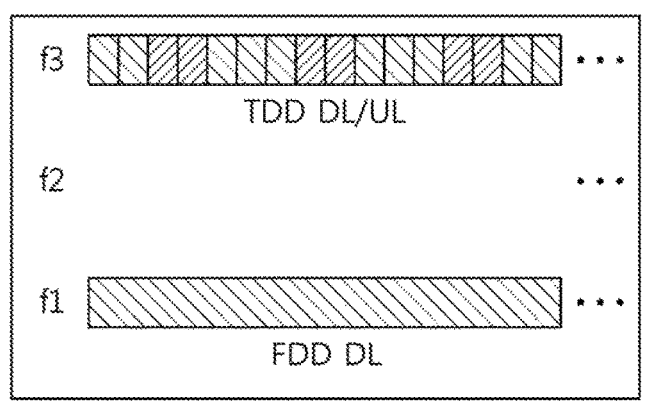
Figure 6:
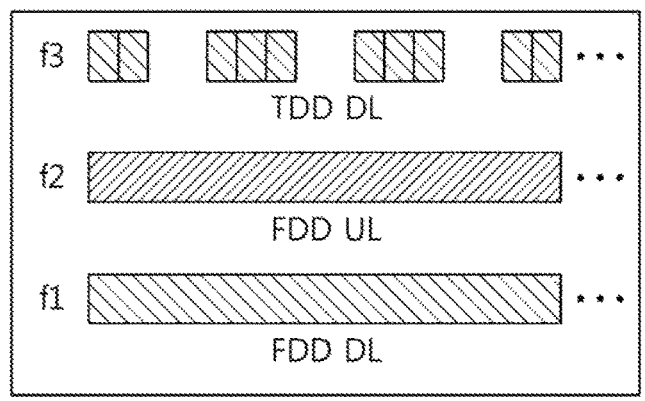

FIG. 6 illustrates the examples of terminal capabilities for TDD-FDD CA that may be applicable to an exemplary embodiment of the present invention. FIG. 6 shows examples for TDD-FDD carrier CA.

Referring to FIG. 6, (a) illustrates that a terminal supports the carrier aggregation of a TDD carrier with an FDD carrier, (b) illustrates that a terminal supports the carrier aggregation of a TDD carrier with an FDD downlink carrier, (c) illustrates that a terminal supports the carrier aggregation of the downlink subframe in a TDD carrier with an FDD carrier.

As stated above, a terminal may support various types of TDD-FDD CA, and moreover, is capable of simultaneous reception in FDD and TDD carriers (that is, DL aggregation), and secondly, may carry out simultaneous transmission in FDD and TDD carriers (i.e., UL aggregation), and thirdly, may carry out simultaneous transmission and reception in FDD and TDD carriers (i.e., full duplex).

In the above TDD-FDD CA, the maximum number of supported aggregation component carriers (CCs) may be, for example, five (5). Further, the aggregation of different UL/DL configurations for TDD carriers in distinct bands may be supported.

In this case, an FDD-TDD CA capable terminal may support TDD-FDD DL CA, and may not support TDD-FDD UL CA. An FDD-TDD CA capable terminal may support at least TDD-FDD DL CA, while it may or may not support TDD-FDD UL CA.

On the one hand, a terminal may establish a dual connectivity via two or more base stations among the base stations constituting at least one serving cell. The dual connectivity is an operation that a corresponding terminal consumes radio resources provided by at least two distinct network points (e.g., macro base station and small base station) in a Radio Resource Control Connected (RRC_CONNECTED) mode. In this case, the at least two distinct network points may be connected via a non-ideal backhaul. At this point, one the at least two distinct network points may called macro base station (or master base station, or anchor base station), and the others may be called small base stations (or secondary base stations or assisting base stations or slave base stations).

A terminal may support a TDD-FDD joint operation if the terminal is configured with carrier aggregation (CA) and/or dual connectivity as described above. However, the traditional periodic channel status reporting method assumed the case that the terminal is configured with a single serving cell, or FDD or TDD type serving cells, it doesn't consider the situation that a TDD serving cell and an FDD serving cell are configured with regard to the terminal. Therefore, a periodic channel status reporting method for a terminal configured with TDD-FDD joint operation is required. The following describes an exemplary embodiment of the invention assuming that the terminal is configured with CA; however, aspects of the present invention may be applied to the case that the terminal is configured with dual connectivity.

A terminal configured with the existing, up to, Rel-11 could always transmit Uplink Control Information (UCI) in PUCCH on primary serving cell (Pcell). However, the need for PUCCH transmission on a Secondary serving cell (Scell) is growing as per the requirement of small cell enhancement and TDD-FDD CA, the PUCCH transmission carrying periodic CSI reporting may be conducted in Scell as well as Pcell. That is, when TDD-FDD CA is configured the PUCCH transmission for periodic CSI reporting may be carried out in Pcell or Scell, and the serving cell in which PUCCH is transmitted may be called "PUCCH transmission serving cell." Hereinafter, it is described assuming that the PUCCH transmission serving cell is Pcell, however the PUCCH transmission serving cell may be a Scell.

Case 1. FDD (Pcell)-TDD (Scell) CA

Case 1 is about the case that a terminal is CA configured with a Pcell, which is an PUCCH transmission serving cell, being configured with FDD, and a Scell being configured with TDD. In the current standard, when the Pcell is configured with FDD as described above, there exists no method of determining a periodicity value for a periodic CSI reporting by TDD based Scell ($N_{pd}$). Thus, to support TDD-FDD CA, a method of determining the periodicity value for periodic CSI reporting by TDD Scell, this may follow the methods described as follows. Here the Scell or Pcell for the periodic CSI reporting may be called serving cell c.

A First Embodiment

In a first embodiment, a periodicity value for serving cell c (e.g., Scell) may be applied based on the FDD configuration or TDD UL/DL configuration of the corresponding serving cell c regardless of Pcell. This can be shown as the below table.

TABLE 6

If a UE is configured with more than one serving cells and a primary cell (i.e. PUCCH serving cell) is FDD(frame structure type 1), for periodic CQI/PMI reporting in a serving cell c which has the frame structure type 2(TDD), the following periodicity values apply for the serving cell c:
The reporting period of $N_{pd} = 1$ is applicable for the serving cell c only if TDD UL/DL configuration of the serving cell c belongs to {0, 1, 3, 4, 6}, and where subframes of the primary cell in UL(i.e. PUCCH serving cell) which are corresponding to UL subframes of the serving cell c in a radio frame are used for CQI/PMI reporting.
The reporting period of $N_{pd} = 5$ is applicable for the serving cell c only if TDD UL/DL configuration of the serving cell c belongs to {0, 1, 2, 6}.
The reporting periods of $N_{pd} = $ {10, 20, 40, 80, 160} are applicable for the serving cell c for any TDD UL/DL configuration of the serving cell c.

Referring to Table 6, when terminal is configured with a plurality of serving cells and the Pcell is FDD, the reporting periodicity value at a TDD serving cell c for periodic CQI/PMI is as follows. In one example, in one radio frame, the subframes of a primary serving cell corresponding to the UL subframes of a serving cell c is used for CQI/PMI reporting, and the reporting period of $N_{pd}=1$ is applicable for serving cell c only if the TDD UL/DL configuration of the serving cell c belongs to {0, 1, 3, 4, 6}. In another example, only when the TDD UL/DL configuration of the serving cell c belongs to {0, 1, 2, 6}, the reporting period of $N_{pd}=5$ is applicable for the serving cell c. In a further example, for any TDD UL/DL configuration of the serving cell c, the reporting period of $N_{pd}=${10, 20, 40, 80, 160} is applicable for the serving cell c.

Further, when eIMTA is enabled at the serving cell c, the TDD UL/DL configuration of the Scell may be replaced with or referred to a UL/DL configuration value configured via RRC signaling. In case, the reporting periodicity value at a serving cell c for periodic CQI/PMI is determined by the reference UL/DL configuration value configured via the RRC signaling.

A Second Embodiment

In the second embodiment, the periodicity value for a serving cell c (e.g., Scell) is based on the above Table 4 which shows the mapping relationship among $I_{CQI/PMI}$, $N_{pd}$ and $N_{offset,CQI}$ for FDD because Pcell is FDD. That is, the periodicity value for a periodic CSI reporting of the TDD based serving cell c may be determined utilizing the above Table 4 which is defined for FDD. This may be described as the following Table 7 or Table 8.

TABLE 7

If a UE is configured with more than one serving cells and a primary cell (i.e. PUCCH serving cell) is FDD(frame structure type 1), for periodic CQI/PMI reporting in a serving cell c (FDD or TDD), the following periodicity values apply for the serving cell c:
The periodicity $N_{pd}$ is determined based on the parameter cqi-pmi-ConfigIndex (ICQI/PMI) given in Table 4 (Parameter from FDD)

TABLE 8

For a UE configured in transmission mode 1-9 and for each serving cell, or for a UE configured in transmission mode 10 and for each CSI process in each serving cell, the periodicity $N_{pd}$(in subframes) and offset $N_{offset,\ CQI}$(in subframes) for CQI/PMI reporting are determined based on the parameter cqi-pmi-ConfigIndex ($I_{CQI/PMI}$) given in Table 4 if the primary cell is FDD.

Referring to Table 7 to Table 8, a terminal is configured with multiple serving cells, and if a Pcell is FDD, the reporting periodicity value in a TDD or FDD serving cell c for periodic CQI/PMI reporting is determined based on cqi-pmi-ConfigIndex ($I_{CQI/PMI}$) value and the above described Table 4 or Table 5.

Case 2. TDD(Pcell)-FDD(Scell) CA

Case 2 is the case that a terminal is CA configured with a Pcell which is a PUCCH transmission serving cell being configured with TDD, and with Scell being configured with FDD. In the current standard, when Pcell is configured with TDD as described above, there exists no method of determining periodicity value for periodic CSI reporting of FDD based Scell ($N_{pd}$). Thus, a method of determining the periodicity value for periodic CSI reporting of an FDD Scell to support TDD-FDD CA, and this may follow the methods as follows. Here the Scell or the Pcell for periodic CSI reporting may be referred to a serving cell c.

In the method, based on the TDD UL/DL configuration of the Pcell, the periodicity value for the serving cell c (e.g., FDD Scell) is applied. The periodicity value for the serving cell c may be represented as the following table. This includes both of the case where the serving cell c is FDD or TDD.

TABLE 9

If a UE is configured with more than one serving cells and a primary cell (i.e. PUCCH serving cell) is TDD(frame structure type 1), for periodic CQI/PMI reporting in a serving cell c (FDD or TDD), the following periodicity values apply for the serving cell c depending on the TDD UL/DL configuration of the primary cell:
The reporting period of $N_{pd}$ = 1 is applicable for the serving cell c only if TDD UL/DL configuration of the primary cell belongs to {0, 1, 3, 4, 6}, and where all UL subframes of the primary cell in a radio frame are used for CQI/PMI reporting.
The reporting period of $N_{pd}$ = 5 is applicable for the serving cell c only if TDD UL/DL configuration of the primary cell belongs to {0, 1, 2, 6}.
The reporting periods of $N_{pd}$ = {10, 20, 40, 80, 160} are applicable for the serving cell c for any TDD UL/DL configuration of the primary cell.

Referring to FIG. 9, in case that a terminal is configured with multiple serving cells and a Pcell is TDD, the reporting periodicity value to a serving cell c (FDD or TDD) for a periodic CQI/PMI is as follows. In one example, within one radio frame all subframes of the Pcell are used for the CQI/PMI reporting, and the reporting period of $N_{pd}$=1 for the serving cell c is applicable only if the TDD UL/DL configuration of the Pcell belongs to {0, 1, 3, 4, 6}. In another example, only if the TDD UL/DL configuration of the Pcell belongs to {0, 1, 2, 6}, the reporting period of $N_{pd}$=5 is applicable for the serving cell c. In further example, for any TDD UL/DL configuration of the Pcell, the reporting period of $N_{pd}$={10, 20, 40, 80, 160} is applicable for the serving cell c.

Further, in case that the Pcell is eIMTA enabled, the TDD UL/DL configuration of the Pcell may be replaced with or referred to a reference UL/DL configuration value configured through a RRC signaling. In case, the reporting periodicity value at a serving cell c for periodic CQI/PMI is determined by the reference UL/DL configuration value configured via the RRC signaling.

Figure 7:
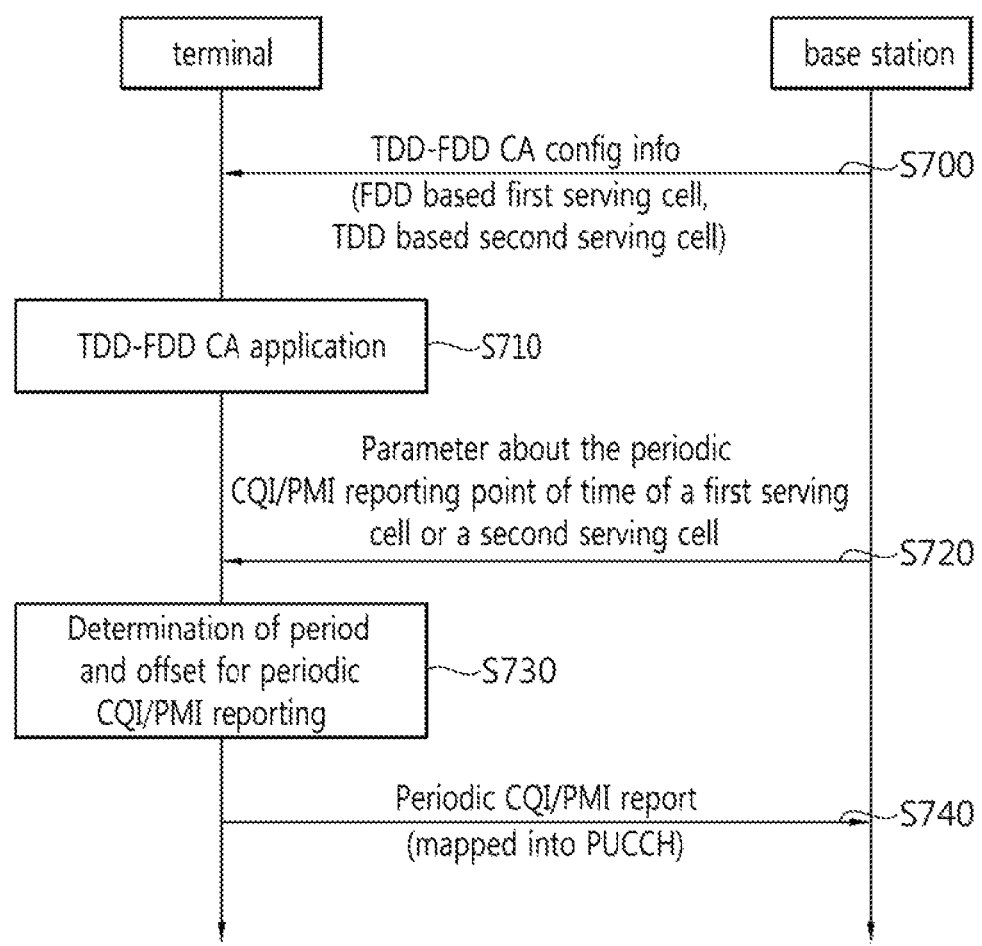
FIG. 7 is a flow chart of CQI/PMI reporting between a terminal and a base station according to an exemplary embodiment of the present invention.

FIG. 7 is a flow chart of CQI/PMI reporting between a terminal and a base station according to an exemplary embodiment of the present invention. In FIG. 7, it is described based on the case that a terminal is configured with a carrier aggregation (CA) of a TDD based serving cell and an FDD based serving cell; also, aspects of the present invention may be applicable when the dual connectivity is established as well as CA as stated above.

Referring to FIG. 7, a base station transmits, to a terminal, a TDD/FDD CA configuration information indicating the carrier aggregation of an FDD based first serving cell and a TDD based second serving cell. The TDD-FDD CA configuration information may include the TDD UL/DL configuration information of the TDD based second serving cell. The base station may transmit the TDD-FDD CA configuration information in a RRC signaling to the terminal.

The terminal applies the carrier aggregation of the FDD based first serving cell and the TDD based second serving cell based on the TDD-FDD CA configuration information (S710). In this case the first serving cell may be a Primary serving cell (Pcell), and the second serving cell may be a Secondary serving cell (Scell). Or the first serving cell may be a secondary serving cell, and the second serving cell may be a primary serving cell.

The base station transmits a parameter about the periodic CQI/PMI reporting point of time of the first serving cell or the second serving cell. The parameter about the periodic CQI/PMI reporting point of time may include the periodic CQI/PMI reporting configuration information, and the above described 'cqi-pmi/ConfigIndex' ($I_{CQI/PMI}$). The base station may receive the parameter in a upper layer signaling such as RRC signaling. Though S720 is illustrated to be conducted after S700 in FIG. 7, S720 may be carried out simultaneously with S700.

The terminal determines the period and the offset for the periodic CQI/PMI reporting of the first serving cell or the second serving cell based on the parameter about the periodic CQI/PMI reporting point of time. In this case the terminal may determine the periodicity value and the offset value based on the parameter (e.g., $I_{CQI/PMI}$) and Table 4 to Table 5. In this case the determination of the periodicity value may be based on the criteria as described in Tables 6 to 9.

In one example, in case that a primary serving cell is FDD and a secondary serving cell is TDD, the periodicity value for the periodic CQI/PMI reporting of the secondary serving cell may depend on the TDD UL/DL configuration of the corresponding secondary serving cell. In this case the periodicity value may be based on the Table 5 which describes the mapping relationship among $I_{CQI/PMI}$ and $N_{pd}$ and offset ($N_{offset,CQI}$) for TDD.

In another example, when the primary serving cell is FDD and the secondary serving cell is TDD, the periodicity value for the periodic CQI/PMI reporting of the secondary serving cell may be based on the above described Table 4 describing the mapping relationship among $I_{CQI/PMI}$ and $N_{pd}$ and offset ($N_{offset,CQI}$) for FDD.

In another example, when the primary serving cell is TDD and the secondary serving cell is FDD, the periodicity value for the periodic CQI reporting of the primary serving cell or the secondary serving cell may depend on the TDD UL/DL configuration of the primary serving cell.

The terminal performs a periodic CQI/PMI reporting to the base station based on the above determined period and offset (S740). The periodic CQI/PMI reporting may be carried out by mapping information of CQI/PMI in PUCCH and transmitted the PUCCH via the first serving cell or the second serving cell. In one example, when the first serving cell is a primary serving cell, the periodic CQI/PMI reporting of the first serving cell or the second serving cell may be carried out via the first serving cell. In another example, in case that the second serving cell is a secondary serving cell and supports PUCCH transmission, the periodic CQI/PMI reporting of the first serving cell or the second serving cell may be performed via the second serving cell.

In accordance with an exemplary embodiment of the present invention, when a terminal is configured with TDD-FDD carrier aggregation (or dual connectivity), that is, even when the TDD/FDD configuration of the primary serving cell and the secondary serving cell is different, smooth data transception between a terminal and a base station may be supported by the periodicity value configuration for the periodic CSI reporting to the secondary serving cell.

Figure 8:
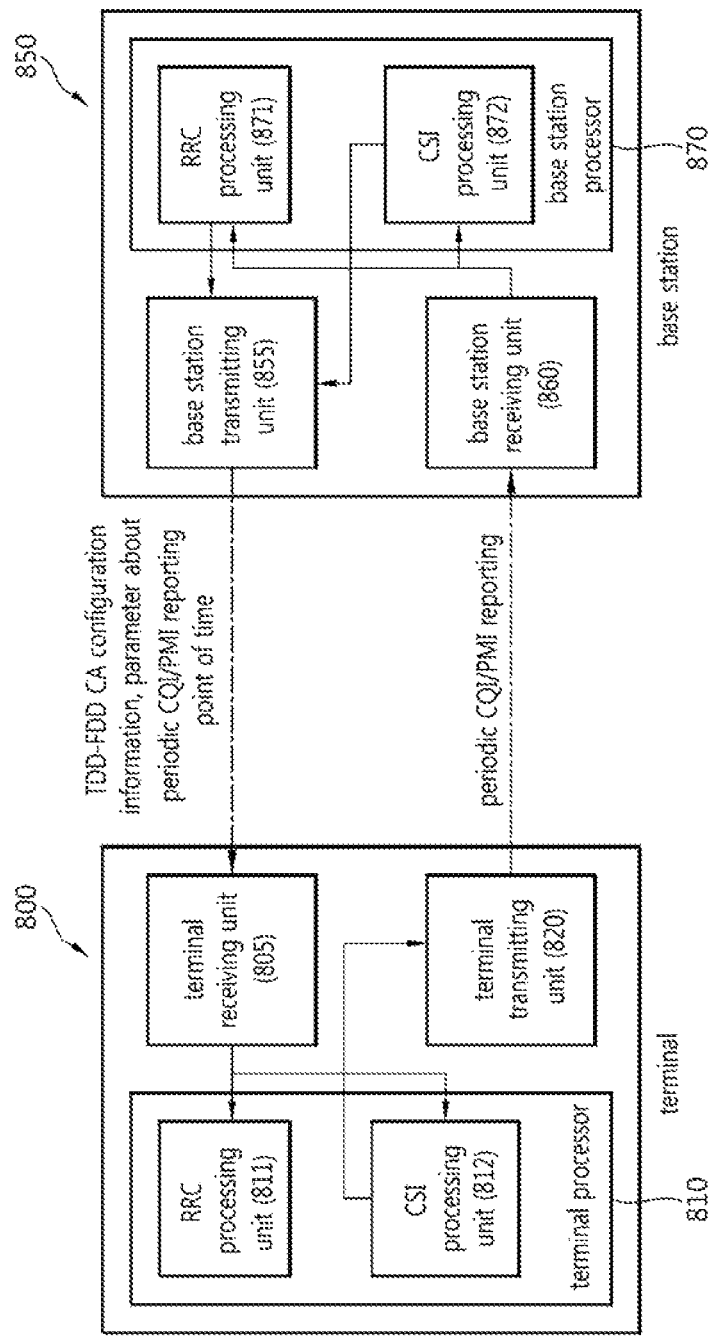
FIG. 8 is a block diagram illustrating a terminal and a base station in accordance with an exemplary embodiment of the present invention.

FIG. 8 is a block diagram illustrating a terminal and a base station in accordance with an exemplary embodiment of the invention.

Referring to FIG. 8, a terminal 800 includes a terminal receiving unit 805, a terminal processor 810 and a terminal transmitting unit 820. The terminal processor 810 also includes a RRC processing unit 811 and a CSI processing unit 812. The terminal receiving unit 805 and the terminal transmitting unit 820 may be implemented as one transceiver or separate transmitter and receiver, for example. The transmitter and the receiver include one or more antennas.

The terminal receiving unit 805 receives a TDD-FDD CA configuration information indicating the carrier aggregation of an FDD based first serving cell and a TDD based second serving cell from the base station 850, and forwards it to the RRC processing unit 811. The TDD-FDD CA configuration information includes the TDD UL/DL configuration information of the second serving cell. Also, the terminal receiving unit 805 receives a parameter about a periodic CQI/PMI reporting point of time of the first serving cell or the second serving cell from the base station 850. In this case the terminal receiving unit 805 may receive the TDD-FDD CA configuration information and/or the parameter about the periodic CQI/PMI reporting point of time via RRC signaling on a Primary serving cell (Pcell) from the base station 850.

The RRC processing unit 811 applies the CA configuration of the FDD based first serving cell and the TDD based second serving cell to the terminal 800 based on the TDD-FDD CA configuration information. In this case, the RRC processing unit 811 may configure, based on the TDD-FDD CA configuration information, the first serving cell as a primary serving cell (Pcell) and the second serving cell (Scell) as a secondary serving cell at the terminal 800. Or the RRC processing unit 811 may configure, based on the TDD-FDD CA configuration information, the first serving cell as a secondary serving cell and the second serving cell as a primary serving cell at the terminal 800.

The RRC processing unit 811 may detect the periodicity value and the offset value for a periodic CQI/PMI reporting of the first serving cell or the second serving cell to forward them to the CSI processing unit 812. The above parameter about the periodic CQI/PMI reporting point of time may include 'cqi-pmi-ConfigIndex' ($I_{CQI/PMI}$). In this case, the RRC processing unit 811 may determine the periodicity value and the offset value based on the parameter (e.g., $I_{CQI/PMI}$) and the above Tables 4 through 5. In this case the above stated criteria predefined between a terminal 800 and a base station 850 in Tables 6 through 9 may form a basis for determining the periodicity value.

Also, the RRC processing unit 811 may configure, based on the parameter about the periodic CQI/PMI reporting point of time, the periodic CQI/PMI reporting of the first serving cell or the second serving cell at the terminal 800.

The CSI processing unit 812 generates the CQI/PMI of the first serving cell or the second serving cell, and carries out a periodic CQI/PMI reporting through the terminal transmitting unit 820 based on the determined (or detected) periodicity and the offset value. In this case the terminal transmitting unit 820 may map the periodic CQI/PMI reporting into PUCCH to communicate to the base station 850 on the primary serving cell or the secondary serving cell.

The base station 850 comprises a base station transmitting unit 855, a base station receiving unit 860 and a base station processor 870. Also the base station processor 870 comprise a RRC processing unit 871 and a CSI processing unit 872. The base station receiving unit 860 and the base station transmitting unit 855 may be implemented as one transceiver or separate transmitter and receiver, for example. The transmitter and the receiver include one or more antennas.

The RRC processing unit 871 generates a TDD-FDD CA configuration information, and forward it to the base station transmitting unit 855. Also the RRC processing unit 871 generates a parameter about the periodic CQI/PMI reporting point of time of the first serving cell or the second serving cell, and forwards it to the base station transmitting unit 855. The RRC processing unit 871 may receive information for generating the parameter about the periodic CQI/PMI reporting point of time from the CSI processing unit 872. The RRC processing unit 871 may determine the periodicity value and the offset value based on the parameter (e.g., $I_{CQI/PMI}$) and Tables 3 to 4. In this case, the determination of the periodicity value may be based on the above criteria between a terminal 800 and a base station 850 which are predefined in Tables 6 through 9.

The base station transmitting unit 855 transmits the TDD-FDD CA configuration information to the terminal 800. Also, the base station transmitting unit 855 sends the parameter about the periodic CQI/PMI reporting point of time of the first serving cell or the second serving cell to the terminal 800. In this case the base station transmitting unit 855 may transmit the TDD-FDD CA configuration information and/or the parameter about the periodic CQI/PMI reporting point of time via RRC signaling on a primary serving cell (Pcell) to the terminal 800. In this case the RRC signaling may be a RRC connection reconfiguration message.

The base station receiving unit 860 receives, at the DL HARQ timing for the second serving cell, an ACK/NACK signal in the uplink subframe of the first serving cell from the terminal 800. The ACK/NACK signal may be received mapped into the PUCCH of the first serving cell.

The CSI processing unit 872 configures the parameter about the periodic CQI/PMI reporting point of time.

Also, the CSI processing unit 872 may perform link adaptation based on the periodic CQI/PMI reporting by the first serving cell or the second serving cell received by the base station receiving unit 860, and may adapt/adjust Modulation and Coding Scheme (MCS) and transmission power per a given channel.

A base station establishes an RRC connection with a UE through a primary serving cell (PCell). If the PCell supports a TDD mode and the base station provides a UE with CA configuration information to configures a secondary serving cell (SCell) supporting an FDD mode, the base station transmits an RRC message including the CA configuration information indicating a TDD-FDD CA. The RRC message may include a cqi-pmi-ConfigIndex, which indicates a periodicity ($N_{pd}$) and an offset ($N_{OFFSET,CQI}$) for CQI and PMI reporting with respect to the SCell.

The UE establishes the RRC connection with the base station and receives the CA configuration information and the cqi-pmi-ConfigIndex. The UE configures a TDD-FDD CA configuration so that the PCell supports a TDD mode and the SCell supports an FDD mode in the UE. When the TDD-FDD CA is configured, the UE determines the periodicity ($N_{pd}$) and the offset ($N_{OFFSET,CQI}$) for CQI and PMI reporting with respect to the SCell based on the above table 5 and the cqi-pmi-ConfigIndex even though the table 5 is generally used for a TDD cell and the SCell supports an FDD mode. In this CA configuration, the periodicity ($N_{pd}$) may be determined further based on a TDD UL/DL configuration of the PCell. For example, periodicity ($N_{pd}$)=1 may be used only when the TDD UL/DL configuration is one of 0, 1, 3, 4, and 6, and periodicity ($N_{pd}$)=5 may be used only when the TDD UL/DL configuration is one of 0, 1, 2, and 6.

If the PCell supports an FDD mode and the base station provides a UE with CA configuration information to configures a secondary serving cell (SCell) supporting a TDD mode, the base station transmits an RRC message including the CA configuration information indicating an FDD-TDD CA. The RRC message may include a cqi-pmi-ConfigIndex, which indicates a periodicity ($N_{pd}$) and an offset ($N_{OFFSET,CQI}$) for CQI and PMI reporting with respect to the SCell.

The UE establishes the RRC connection with the base station and receives the CA configuration information and the cqi-pmi-ConfigIndex. The UE configures an FDD-TDD CA configuration so that the PCell supports an FDD mode and the SCell supports a TDD mode in the UE. When the FDD-TDD CA is configured, the UE determines the periodicity ($N_{pd}$) and the offset ($N_{OFFSET,CQI}$) for CQI and PMI reporting with respect to the SCell based on the above table 4 and the cqi-pmi-ConfigIndex even though the table 4 is generally used for an FDD cell and the SCell supports a TDD mode. Further, when eIMTA is enabled at the serving cell c, the TDD UL/DL configuration of the Scell may be replaced with or referred to a UL/DL configuration value configured via RRC signaling. In case, the reporting periodicity value at a serving cell c for periodic CQI/PMI is determined by the reference UL/DL configuration value configured via the RRC signaling.

Once the periodicity ($N_{pd}$) and the offset ($N_{OFFSET,CQI}$) are determined, the UE reports channel state information of the SCell to the base station. The UE periodically transmits a channel quality indicator (CQI) for the SCell and/or a precoding matrix indicator (PMI) for the SCell so that the base station determines the channel state of the SCell for communication with the UE.

While the present invention has been shown and described in connection with the embodiments, it will be apparent to those skilled in the art that modifications and variations can be made without departing from the spirit and scope of the invention as defined by the appended claims. Thus, the present invention is not limited to the foregoing embodiments and may include all the embodiments within the scope of the appended claims.

What is claimed is:

1. A user equipment (UE) to transmit at least one of a Channel Quality Indicator (CQI) and a Precoding Matrix Indicator (PMI), the UE comprising:
a processor to establish a Radio Resource Control (RRC) connection with a base station through a first serving cell, the first serving cell supporting a Time Division Duplex (TDD) mode;
a receiver to receive an RRC message from the base station through the first serving cell; and
a transmitter,
wherein the processor is configured to determine the RRC message comprising carrier aggregation (CA) configuration information, the CA configuration information comprising information of a second serving cell supporting a Frequency Division Duplex (FDD) mode, and the first serving cell and the second serving cell being aggregated by a TDD-FDD CA scheme and determine a periodicity (Npd) and an offset (NOFFSET,CQI) based on a cqi-pmi-ConfigIndex received from the base station, the cqi-pmi-ConfigIndex being a numerical parameter, the periodicity (Npd) being a periodicity for periodically reporting at least one of CQI and PMI with respect to the second serving cell, the offset (NOFFSET,CQI) being an offset for periodically reporting the at least one of CQI and PMI, and the periodicity (Npd) being determined further based on a TDD UL(Uplink)/DL(Downlink) configuration of the first serving cell,
wherein the transmitter periodically transmits, to the base station, the at least one of CQI and PMI according to the periodicity (Npd) and the offset (NOFFSET,CQI) through the first serving cell or the second serving cell, and
wherein the processor is configured to determine the periodicity ($N_{pd}$) and the offset ($N_{OFFSET,CQI}$) based on the cqi-pmi-ConfigIndex ($I_{CQI/PMI}$) shown in Table 1:

TABLE 1

| $I_{CQI/PMI}$ | Value of $N_{pd}$ | Value of $N_{OFFSET, CQI}$ |
|---|---|---|
| $I_{CQI/PMI}$ = 0 | 1 | $I_{CQI/PMI}$ |
| 1 ≤ $I_{CQI/PMI}$ ≤ 5# | 5 | $I_{CQI/PMI}$ − 1 |
| 6 ≤ $I_{CQI/PMI}$ ≤ 15# | 10 | $I_{CQI/PMI}$ − 6 |
| 16 ≤ $I_{CQI/PMI}$ ≤ 35# | 20 | $I_{CQI/PMI}$ − 16 |
| 36 ≤ $I_{CQI/PMI}$ ≤ 75# | 40 | $I_{CQI/PMI}$ − 36 |
| 76 ≤ $I_{CQI/PMI}$ ≤ 155# | 80 | $I_{CQI/PMI}$ − 76 |
| 156 ≤ $I_{CQI/PMI}$ ≤ 315# | 160 | $I_{CQI/PMI}$ − 156 |
| 316 ≤ $I_{CQI/PMI}$ ≤ 1023# | | Reserved. |

2. The UE of claim 1, wherein:
when the first serving cell is a primary serving cell supporting the TDD mode, the second serving cell is a secondary serving cell supporting the FDD mode, and the TDD UL/DL configuration of the first serving cell belongs to {0, 1, 3, 4, 6}, the receiver receives the cqi-pmi-ConfigIndex indicating that the periodicity (Npd) for the second serving cell is set as 1.

3. The UE of claim 1, wherein:
when the first serving cell is a primary serving cell supporting the TDD mode, the second serving cell is a secondary serving cell supporting the FDD mode, and the TDD UL/DL configuration of the first serving cell belongs to {0, 1, 2, 6}, the receiver receives the cqi-pmi-ConfigIndex indicating that the periodicity (Npd) for the second serving cell is set as 5.

4. The UE of claim 1, wherein:
when the first serving cell is a primary serving cell supporting the TDD mode, the second serving cell is a secondary serving cell supporting the FDD mode, and the TDD UL/DL configuration of the first serving cell belongs to {0, 1, 2, 3, 4, 5, 6}, the receiver receives the cqi-pmi-ConfigIndex indicating that the periodicity (Npd) for the second serving cell is set as one of 10, 20, 40, 80, and 160.

5. The UE of claim 1, wherein:
the receiver receives information to configure enhanced Interference Management and Traffic Adaptation (eIMTA) for the first serving cell;
the processor is configured to confirm DL reference UL/DL configuration of the first serving cell; and
the receiver receives the cqi-pmi-ConfigIndex from the base station.

6. The UE of claim 5, wherein, if the UE is configured with the eIMTA for the first serving cell supporting the TDD mode, the TDD UL/DL configuration of the first serving cell corresponds to DL reference UL/DL configuration.

7. The UE of claim 5, wherein, if the UE is configured with the eIMTA for the first serving cell supporting the TDD mode, the processor is configured to select the DL reference UL/DL configuration of the first serving cell for DL HARQ from among TDD UL/DL configuration {2, 4, 5}.

8. The UE of claim 1, wherein the transmitter transmits the CQI and the PMI as channel state information for the second serving cell, and the CQI and the PMI are included in a Physical Uplink Control Channel (PUCCH), and
wherein the transmitter transmits the PUCCH through the first serving cell or the second serving cell.

9. A user equipment (UE) to transmit at least one of a Channel Quality Indicator (CQI) and a Precoding Matrix Indicator (PMI), the UE comprising:
a processor to establish a Radio Resource Control (RRC) connection with a base station through a first serving cell, the first serving cell supporting a Frequency Division Duplex (FDD) mode;
a receiver to receive an RRC message from the base station through the first serving cell; and
a transmitter,
wherein the processor is configured to determine the RRC message comprising carrier aggregation (CA) configuration information, the CA configuration information comprising information of a second serving cell supporting a Time Division Duplex (TDD) mode, and the first serving cell and the second serving cell being aggregated by an FDD-TDD CA scheme and determine a periodicity (Npd) and an offset (NOFFSET,CQI) based on a cqi-pmi-ConfigIndex received from the base station, the cqi-pmi-ConfigIndex being a numerical parameter, the periodicity (Npd) being a periodicity for periodically reporting at least one of CQI and PMI with respect to the second serving cell, and the offset (NOFFSET,CQI) being an offset for periodically reporting the at least one of CQI and PMI, wherein the transmitter periodically transmits, to the base station, the at least one of CQI and PMI according to the periodicity (Npd) and the offset (NOFFSET,CQI) through the first serving cell or the second serving cell, and
wherein the processor is configured to determine the periodicity (Npd) and the offset (NOFFSET,CQI) based on the cqi-pmi-ConfigIndex (ICQI/PMI) shown in Table 2

TABLE 2

| $I_{CQI/PMI}$ | Value of $N_{pd}$ | Value of $N_{OFFSET, CQI}$ |
|---|---|---|
| $0 \le I_{CQI/PMI} \le 1$ | 2 | $I_{CQI/PMI}$ |
| $2 \le I_{CQI/PMI} \le 6\#$ | 5 | $I_{CQI/PMI} - 2$ |
| $7 \le I_{CQI/PMI} \le 16\#$ | 10 | $I_{CQI/PMI} - 7$ |
| $17 \le I_{CQI/PMI} \le 36\#$ | 20 | $I_{CQI/PMI} - 17$ |
| $37 \le I_{CQI/PMI} \le 76\#$ | 40 | $I_{CQI/PMI} - 37$ |
| $77 \le I_{CQI/PMI} \le 156\#$ | 80 | $I_{CQI/PMI} - 77$ |
| $157 \le I_{CQI/PMI} \le 316\#$ | 160 | $I_{CQI/PMI} - 157$ |
| $I_{CQI/PMI} = 317\#$ | | Reserved |
| $318 \le I_{CQI/PMI} \le 349\#$ | 32 | $I_{CQI/PMI} - 318$ |
| $350 \le I_{CQI/PMI} \le 413\#$ | 64 | $I_{CQI/PMI} - 350$ |
| $414 \le I_{CQI/PMI} \le 541\#$ | 128 | $I_{CQI/PMI} - 414$ |
| $542 \le I_{CQI/PMI} \le 1023\#$ | | Reserved. |

10. The UE of claim 9, wherein the transmitter transmits the CQI and the PMI as channel state information for the second serving cell, and the CQI and the PMI are included in a Physical Uplink Control Channel (PUCCH), and
wherein the transmitter transmits the PUCCH through the first serving cell or the second serving cell.

11. A base station to receive at least one of a Channel Quality Indicator (CQI) and a Precoding Matrix Indicator (PMI), the base station comprising:
a processor to establish a Radio Resource Control (RRC) connection with a user equipment (UE) through a first serving cell, the first serving cell supporting a Time Division Duplex (TDD) mode or a Frequency Division Duplex (FDD) mode;
a transmitter to transmit an RRC message for the UE through the first serving cell, the RRC message comprising carrier aggregation (CA) configuration information and a cqi-pmi-ConfigIndex, the CA configuration information comprising information of a second serving cell supporting an FDD mode or a TDD mode, and the first serving cell and the second serving cell being aggregated by a TDD-FDD CA scheme or an FDD-TDD CA scheme for the UE; and
a receiver to periodically receive, from the UE, at least one of CQI and PMI with respect to the second serving cell, the at least one of CQI and PMI being received through the first serving cell or the second serving cell,
wherein the processor is configured to determine a periodicity (Npd) and an offset (NOFFSET,CQI) for the at least one of CQI and PMI based on the cqi-pmi-ConfigIndex, the cqi-pmi-ConfigIndex being a numerical parameter, the periodicity (Npd) being a periodicity for periodically reporting the at least one of CQI and PMI with respect to the second serving cell, and the offset (NOFFSET,CQI) being an offset for periodically reporting the at least one of CQI and PMI, and
wherein, when the first serving cell supports a TDD mode and the second serving cell supports an FDD mode, the processor is configured to determine the periodicity (Npd) further based on a TDD UL(Uplink)/DL(Downlink) configuration of the first serving cell, wherein, when the first serving cell supports a TDD mode and the second serving cell supports an FDD mode, the processor is configured to determine the periodicity ($N_{pd}$) and the offset ($N_{OFFSET,CQI}$) based on the cqi-pmi-ConfigIndex ($I_{CQI/PMI}$) shown in Table 3:

TABLE 3

| $I_{CQI/PMI}$ | Value of $N_{pd}$ | Value of $N_{OFFSET, CQI}$ |
|---|---|---|
| $I_{CQI/PMI} = 0$ | 1 | $I_{CQI/PMI}$ |
| $1 \le I_{CQI/PMI} \le 5\#$ | 5 | $I_{CQI/PMI} - 1$ |
| $6 \le I_{CQI/PMI} \le 15\#$ | 10 | $I_{CQI/PMI} - 6$ |
| $16 \le I_{CQI/PMI} \le 35\#$ | 20 | $I_{CQI/PMI} - 16$ |
| $36 \le I_{CQI/PMI} \le 75\#$ | 40 | $I_{CQI/PMI} - 36$ |
| $76 \le I_{CQI/PMI} \le 155\#$ | 80 | $I_{CQI/PMI} - 76$ |
| $156 \le I_{CQI/PMI} \le 315\#$ | 160 | $I_{CQI/PMI} - 156$ |
| $316 \le I_{CQI/PMI} \le 1023\#$ | | Reserved. |

12. The base station of claim 11, wherein:
when the first serving cell is a primary serving cell supporting the TDD mode, the second serving cell is a secondary serving cell supporting the FDD mode, and the TDD UL/DL configuration of the first serving cell belongs to {0, 1, 3, 4, 6}, the transmitter transmits the cqi-pmi-ConfigIndex indicating that the periodicity (Npd) for the second serving cell is set as 1.

13. The base station of claim 11, wherein:
when the first serving cell is a primary serving cell supporting the TDD mode, the second serving cell is a secondary serving cell supporting the FDD mode, and the TDD UL/DL configuration of the first serving cell belongs to {0, 1, 2, 6}, the transmitter transmits the cqi-pmi-ConfigIndex indicating that the periodicity (Npd) for the second serving cell is set as 5.

14. The base station of claim 11, wherein:
when the first serving cell is a primary serving cell supporting the TDD mode, the second serving cell is a secondary serving cell supporting the FDD mode, and the TDD UL/DL configuration of the first serving cell belongs to {0, 1, 2, 3, 4, 5, 6}, the transmitter transmits the cqi-pmi-ConfigIndex indicating that the periodicity (Npd) for the second serving cell is set as one of 10, 20, 40, 80, and 160.

15. The base station of claim 11, wherein:
the transmitter transmits information to configure enhanced Interference Management and Traffic Adaptation (eIMTA) for the first serving cell.

16. The base station of claim 15, wherein, if the UE is configured with the eIMTA for the first serving cell supporting the TDD mode, the TDD UL/DL configuration of the first serving cell corresponds to DL reference UL/DL configuration.

17. The base station of claim 11, when, the first serving cell supports an FDD mode and the second serving cell supports a TDD mode, the processor is configured to determine the periodicity ($N_{pd}$) and the offset ($N_{OFFSET,CQI}$) based on the cqi-pmi-ConfigIndex ($I_{CQI/PMI}$) shown in Table 4

TABLE 4

| $I_{CQI/PMI}$ | Value of $N_{pd}$ | Value of $N_{OFFSET, CQI}$ |
|---|---|---|
| $0 \le I_{CQI/PMI} \le 1$ | 2 | $I_{CQI/PMI}$ |
| $2 \le I_{CQI/PMI} \le 6\#$ | 5 | $I_{CQI/PMI} - 2$ |
| $7 \le I_{CQI/PMI} \le 16\#$ | 10 | $I_{CQI/PMI} - 7$ |
| $17 \le I_{CQI/PMI} \le 36\#$ | 20 | $I_{CQI/PMI} - 17$ |
| $37 \le I_{CQI/PMI} \le 76\#$ | 40 | $I_{CQI/PMI} - 37$ |
| $77 \le I_{CQI/PMI} \le 156\#$ | 80 | $I_{CQI/PMI} - 77$ |
| $157 \le I_{CQI/PMI} \le 316\#$ | 160 | $I_{CQI/PMI} - 157$ |
| $I_{CQI/PMI} = 317\#$ | | Reserved |
| $318 \le I_{CQI/PMI} \le 349\#$ | 32 | $I_{CQI/PMI} - 318$ |
| $350 \le I_{CQI/PMI} \le 413\#$ | 64 | $I_{CQI/PMI} - 350$ |
| $414 \le I_{CQI/PMI} \le 541\#$ | 128 | $I_{CQI/PMI} - 414$ |
| $542 \le I_{CQI/PMI} \le 1023\#$ | | Reserved. |

18. The base station of claim 11, wherein the receiver receives the CQI and the PMI as channel state information for the second serving cell, and the CQI and the PMI are included in a Physical Uplink Control Channel (PUCCH), and wherein the receiver receives the PUCCH through the first serving cell or the second serving cell.

* * * * *